(12) United States Patent
Purdy

(10) Patent No.: US 7,265,762 B2
(45) Date of Patent: Sep. 4, 2007

(54) METHOD AND APPARATUS FOR REPRESENTING DATA USING LAYERED OBJECTS

(75) Inventor: D. Gray Purdy, Seattle, WA (US)

(73) Assignee: Quid Novi, S.A., Inc., Seattle, WA (US)

( * ) Notice: Subject to any disclaimer, the term of this patent is extended or adjusted under 35 U.S.C. 154(b) by 32 days.

(21) Appl. No.: 10/737,947

(22) Filed: Dec. 17, 2003

(65) Prior Publication Data

US 2005/0134607 A1  Jun. 23, 2005

(51) Int. Cl.
*G09G 5/00* (2006.01)
(52) U.S. Cl. ...................................... 345/629
(58) Field of Classification Search ............... 715/794, 715/795, 796, 797; 345/619, 629
See application file for complete search history.

(56) References Cited

U.S. PATENT DOCUMENTS

| | | | | |
|---|---|---|---|---|
| 5,075,675 A | * | 12/1991 | Barker et al. | 715/794 |
| 5,892,511 A | * | 4/1999 | Gelsinger et al. | 715/794 |
| 5,900,859 A | * | 5/1999 | Takishita et al. | 345/629 |
| 6,005,578 A | * | 12/1999 | Cole | 715/854 |
| 6,040,833 A | * | 3/2000 | Henshaw | 715/794 |
| 6,191,799 B1 | | 2/2001 | Purdy | |
| 6,222,540 B1 | * | 4/2001 | Sacerdoti | 345/581 |
| 6,429,883 B1 | * | 8/2002 | Plow et al. | 715/768 |
| 6,445,400 B1 | * | 9/2002 | Maddalozzo et al. | 715/803 |
| 6,466,210 B1 | * | 10/2002 | Carlsen et al. | 345/629 |
| 6,473,103 B1 | * | 10/2002 | Bailey et al. | 715/794 |
| 6,747,650 B2 | * | 6/2004 | Turner et al. | 345/473 |
| 6,756,983 B1 | * | 6/2004 | Borosh | 345/440 |
| 6,803,923 B1 | * | 10/2004 | Hamburg | 345/629 |
| 7,187,389 B2 | * | 3/2007 | Redpath et al. | 345/619 |
| 2003/0009411 A1 | * | 1/2003 | Ram et al. | 705/37 |
| 2003/0197702 A1 | * | 10/2003 | Turner et al. | 345/473 |
| 2004/0007121 A1 | * | 1/2004 | Graves et al. | 89/1.11 |
| 2004/0243388 A1 | * | 12/2004 | Corman et al. | 704/1 |

* cited by examiner

*Primary Examiner*—Ulka J. Chauhan
*Assistant Examiner*—Dan Washburn
(74) *Attorney, Agent, or Firm*—Christensen O'Connor Johnson Kindness PLLC

(57) ABSTRACT

A multilayer data animation program is provided that controls the simultaneous display of objects that represent complex or interrelated data, where the appearance of the objects may change over time to reflect changes in the data. The multilayer data animation program layers the objects in an indicator having a hierarchy of layers based on the importance of the data that each object represents relative to the data that the other objects represent. The objects are periodically updated to reflect changes in the data, and the multilayer data animation program alters the display of the objects in accordance with the layer hierarchy when the display of objects on one layer conflicts with objects on another layer.

35 Claims, 14 Drawing Sheets

METHOD AND APPARATUS FOR REPRESENTING DATA USING LAYERED OBJECTS

FIELD OF THE INVENTION

This invention generally relates to a method and apparatus for graphically representing data as an object and, more particularly, to a method and apparatus for controlling the simultaneous display of objects that represent complex or interrelated data.

BACKGROUND OF THE INVENTION

With the advent of computers and computer networks, including the Internet, massive quantities and types of data have become available to computer users. Computer users may now obtain virtually any type of data in any quantity from virtually any data source. However, the challenge is in assimilating and presenting the data obtained in a meaningful manner to the computer user.

Clearly, the types, quantities, and sources of data available to computer users are virtually without limit. However, one specific example of available data that is particularly illustrative of the type with which the present invention may be used is financial market data. Financial market data includes any and all market information, current or historical, such as the trading prices and volumes of stocks, bonds, stock funds, bond funds, market indices, commodities, commodity indices, monetary exchange rates, and any other market trading data. Investors have long had at their disposal voluminous amounts of textual and numerical financial market data. They have even been able to view such data graphically, such as with a bar graph, line diagram, or pie chart. However, such graphical displays of data still have drawbacks in that they do not necessarily convey to the investor an immediate sense of how quickly the price or volume of a particular stock may be changing or trading at any given instant. Consequently, the investor is required to perform more mental calculation than she would like in order to obtain the desired information.

U.S. Pat. No. 6,191,799 discloses the use of animated objects to overcome some of these shortcomings in the prior art. However, even when the data is graphically represented to a user using animated objects, the amount of available display area may be too limited to accommodate the simultaneous display of sufficient numbers of objects to adequately represent particularly complex or interrelated data. Moreover, the relationship of some of the data to other data may not be adequately represented using animated objects alone.

SUMMARY OF THE INVENTION

The present invention provides a multilayer data animation program for controlling the simultaneous display of objects that represent data, the appearance of which may change over time to reflect changes in the data. The multilayer data animation program determines the relative importance of the objects and controls their display so that less important objects do not interfere with the display of more important objects when the objects overlap or conflict with one another, i.e., occupy the same two-dimensional area of the visual display.

The relative importance of objects is determined based on each object's association with a layer of a multilayer animated data indicator. A multilayer animated data indicator is a collection of objects in which each object is associated with a layer of the indicator, and at least one object is animated to represent changes in the data that it represents. A layer is a virtual level within a predefined visual hierarchy of layers that provides a virtual third dimension to an otherwise two-dimensional visual display of the objects comprising the indicator. The rank of each layer within the hierarchy indicates the level of importance of the data represented by the objects associated with that layer.

Each layer of the multilayer animated data indicator has a predefined display and monitoring interval after which the appearance of the objects associated with that layer may be altered to reflect changes in the data. After each such interval, whenever the altered appearance of the objects causes objects associated with different layers to overlap or conflict, i.e., to occupy the same area of the visual display, the multilayer data animation program determines the relative importance of the objects and controls the display accordingly.

The multilayer data animation program further provides an indicator user interface to allow a user to select for a given indicator which objects represent the data, as well as to select the layer with which each object is associated. The objects are generally selected based on whether the objects possess the appropriate range, motion, or other characteristic to adequately represent changes in the data based on the type of data to be represented in the indicator. The layers are generally selected based on whether the layer has appropriate importance in the hierarchy of layers to adequately represent the data relative to other objects associated with other layers in the hierarchy. The layer is also selected based on whether the layer also has display and monitoring intervals of appropriate frequency to adequately reflect changes in the data.

More than one animated object may be associated with any given layer, and any number of layers may be provided for any given indicator. Moreover, the multilayer data animation program may control several multilayer animated data indicators simultaneously, where each indicator may have the same or different number of layers and typically occupies a separate portion of the visual display. For example, one indicator occupying an upper right portion of the visual display may have only five objects on three different layers, while another indicator occupying a lower left portion of the display may have 12 objects on eight or nine layers. In general, the number of layers and objects in a given indicator reflects the complexity of the data that the indicator represents.

A method and an apparatus capable of performing actions generally consistent with the multilayer data animation program described above represent further aspects of the present invention.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
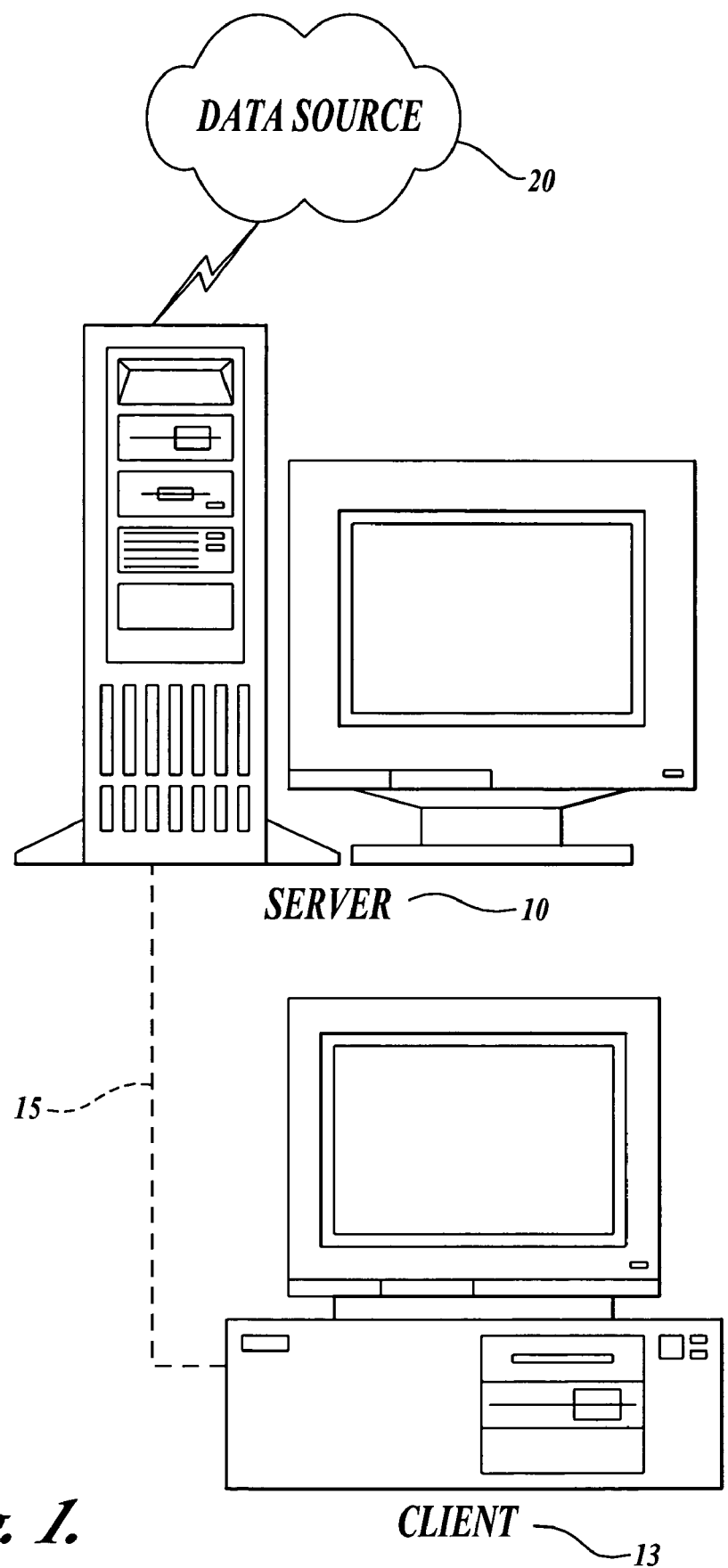
FIG. 1 is a pictorial diagram of a server that controls the simultaneous display of multiple objects that represent data using a multilayer animated indicator and transmits the indicator to a client for display in accordance with the present invention.

FIG. 1 depicts a client/server environment in which the present invention may operate to control the simultaneous display of multiple animated objects that represent data using a multilayer animated indicator. In accordance with the present invention, a server computer 10 receives data from a data source 20 and uses the data to alter the appearance of an animated object representing that data, as described in detail in U.S. Pat. No. 6,191,799, issued to the assignee of the present invention, and which is herein incorporated by reference. The data source 20 may be any device, program, database, or other entity capable of collecting and storing data and communicating data to the server 10. The data source 20 may be a local data source, such as a heat sensor connected directly to the server 10, a file stored in memory of the server, or a user entering data to server memory using a keyboard. On the other hand, the data source 20 may be a remote data source in communication with the server 10 via an intranetwork or an internetwork, such as the Internet. Accordingly, the data received by the server 10 and represented by an animated object and ultimately, by a multilayer animated indicator, in accordance with the present invention, may be of any conceivable type or nature capable of being represented by an animated object. Some practical examples of the types of data with which embodiments of the present invention may be used include temperature data collected by the heat sensor mentioned above or New York Stock Exchange (NYSE) stock information available from an Internet Web site (i.e., a server connected to the Internet that has mass storage facilities for storing hypertext documents and that runs administrative software for handling those hypertext documents).

As is described in commonly assigned U.S. Pat. No. 6,191,799, the server alters the appearance of the animated object as the data represented by the animated object and provided by the data source 20 changes, e.g., by rotating the object or passing it across a display. Accordingly, the user is given an immediate visual, and perhaps aural or interactive, indication of how the data in which the user is interested is changing. As will be described in more detail below, the server may further control the simultaneous display of such animated objects using a multilayer animated indicator.

In one embodiment of the present invention, the server 10 transfers the multilayer animated indicator comprising the altered animated objects to a client computer 13 whose user is interested in the data represented by that multilayer animated indicator over a remote connection 15. The client 13 then displays the multilayer animated indicator as provided by the server. The client 13 may be connected to the server 10 via an intranetwork (i.e., a LAN), an internetwork (i.e., the Internet) or remotely via a modem. However, it will be appreciated that in other embodiments of the present invention the server 10 does not transfer the multilayer animated indicator to a client 13 for display. Instead, the server 10 alters the appearance of the animated objects that comprise the multilayer animated indicator as well as controlling the display of the multilayer animated indicator itself.

Figure 2A:
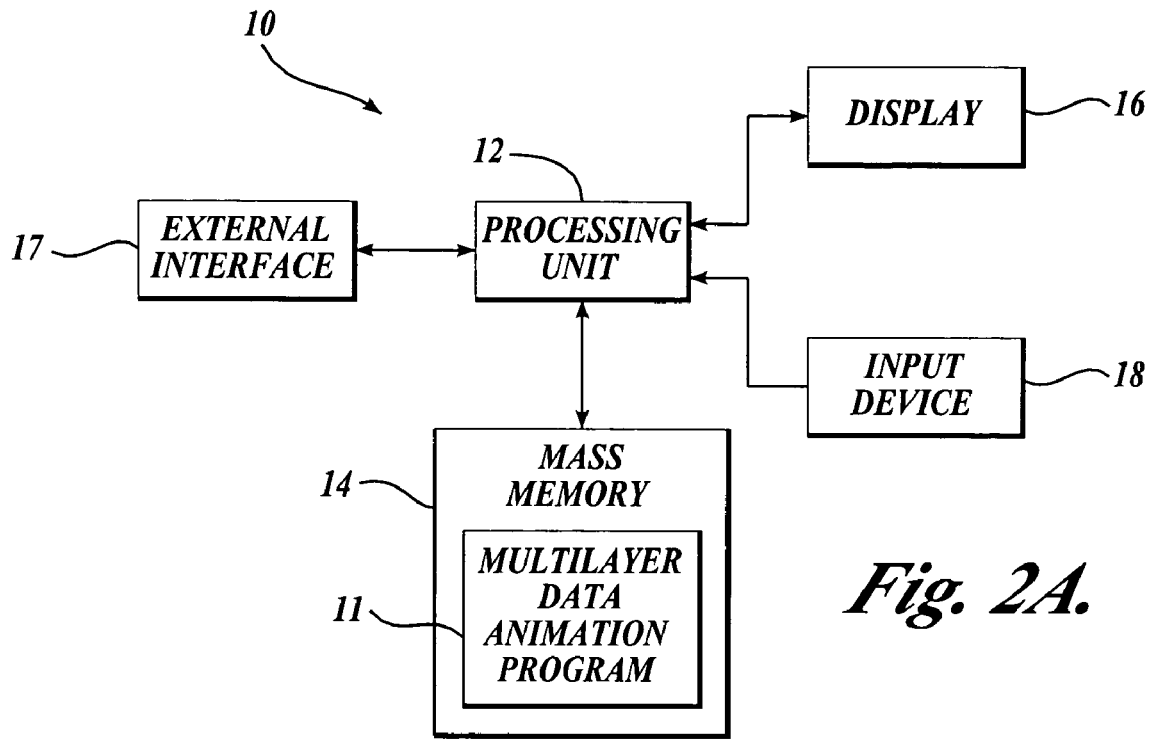
FIG. 2A is a block diagram of the several components of the server shown in FIG. 1 that is used to control the simultaneous display of multiple objects using a multilayer animated indicator in accordance with the present invention.

FIG. 2A depicts several of the key components of the server 10 used to implement the present invention. Those of ordinary skill in the art will appreciate that the server 10 includes many more components than those shown in FIG. 2A. However, it is not necessary that all of these generally conventional components be shown in order to disclose an enabling embodiment for practicing the present invention. As shown in FIG. 2A, the server 10 includes a processing unit 12, a display 16, and a mass memory 14. Mass memory 14 generally comprises a random access memory (RAM), read only memory (ROM), and a permanent mass storage device, such as a hard disk drive, tape drive, optical drive, floppy disk drive, or a combination thereof. The mass memory 14 stores the program code and data necessary for processing animated objects and multilayer animated indicators in accordance with the present invention. More specifically, the mass memory 14 is used to store a multilayer data animation program 11, formed in accordance with the present invention, to create and initialize a multilayer animated indicator comprising multiple animated objects and, further, to control the simultaneous display of those objects as their appearances change to reflect changes in the data provided by the data source 20.

The server 10 also includes an input device 18 and an external interface 17. The input device 18 may be implemented by a user of the server 10 to input data, default values, and various user selections to the multilayer data animation program 11. The input device may be of any conventional type, such as a keyboard, mouse, track-ball, etc. The server 10 communicates to the client 13 and receives data from the data source 20 through the external interface 17. In one embodiment of the present invention, the server is connected to a local area network, which in turn, is connected to the Internet. Thus, the external interface 17 comprises a network interface card including the necessary circuitry for a wired or wireless connection. The external interface 17 is also constructed for use with the Transmission Control Protocol/Internet Protocol (i.e., the standard transmission protocol for the Internet, also known as "TCP/IP"), the particular network configuration of the local area network it is connecting to, and a particular type of coupling medium. In other embodiments of the present invention, the external interface 17 comprises a modem.

Figure 2B:
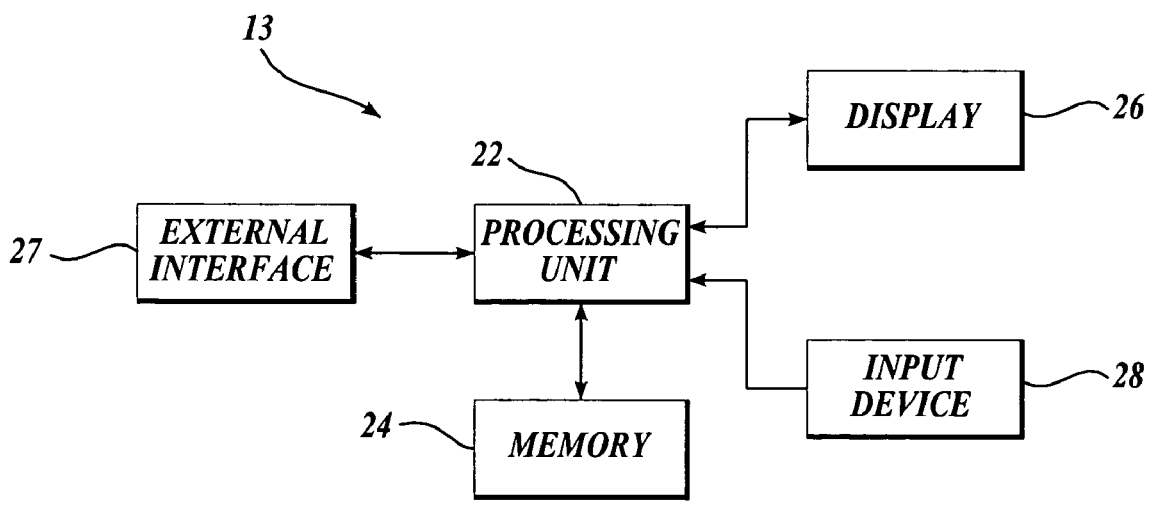
FIG. 2B is a block diagram of the several components of the client shown in FIG. 1 that is used to display multiple objects using a multilayer animated indicator in accordance with the present invention.

As noted above, the server 10 transmits the multilayer animated data indicator to the client 13 via a remote connection 15 established by the external interface 17. The key components of the client 13 used to display the multilayer animated data indicator are shown in FIG. 2B. Again, those of ordinary skill in the art will appreciate that the client 13 includes many more components than those shown in FIG. 2B. However, it is not necessary that all of these generally conventional components be shown in order to disclose an enabling embodiment for practicing the present invention. The client 13 communicates with the server 10 over a remote connection 15 via an external interface 27. In one embodiment of the present invention described herein, the client 13 is connected to a local area network that, in turn, is connected to the Internet. Accordingly, external interface 27 includes the necessary circuitry for a wired or wireless connection, and is also constructed for use with the TCP/IP protocol, the particular network configuration of the local area network to which it is connected, and the particular type of communication medium over which the connection is made. In another embodiment of the present invention, the client's external interface 27 is a modem through which the client 13 may contact the server 13 directly.

In addition to the external interface 27, the client computer 13 includes a display 26, a memory 24, and a processing unit 22. The memory 24 generally comprises a random access memory (RAM), a read-only memory (ROM), and a permanent storage device, such as a disk drive. The memory stores the multilayer animated data indicator provided by the server 10 and the program code implemented by the processing unit 22 for presenting the multilayer animated data indicator on the display 26.

Finally, the client 13 includes an input device 28 used to perform various actions, such as to input or modify default values to the multilayer data animation program 11, to select animated objects for display in an appropriate layer of a multilayer animated data indicator, and to initiate a connection to the server 10. The input device 28 may be of any conventional type, such as a keyboard, mouse, track-ball, etc.

Figure 3A:
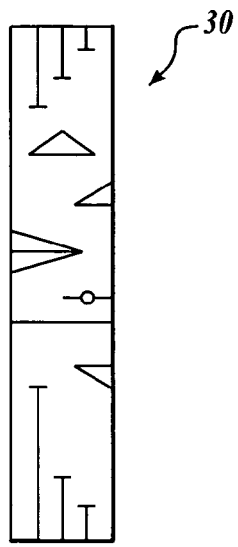
FIG. 3A depicts an actual view of an exemplary multilayer animated indicator having objects that are displayed in accordance with the present invention.
Figure 3B:
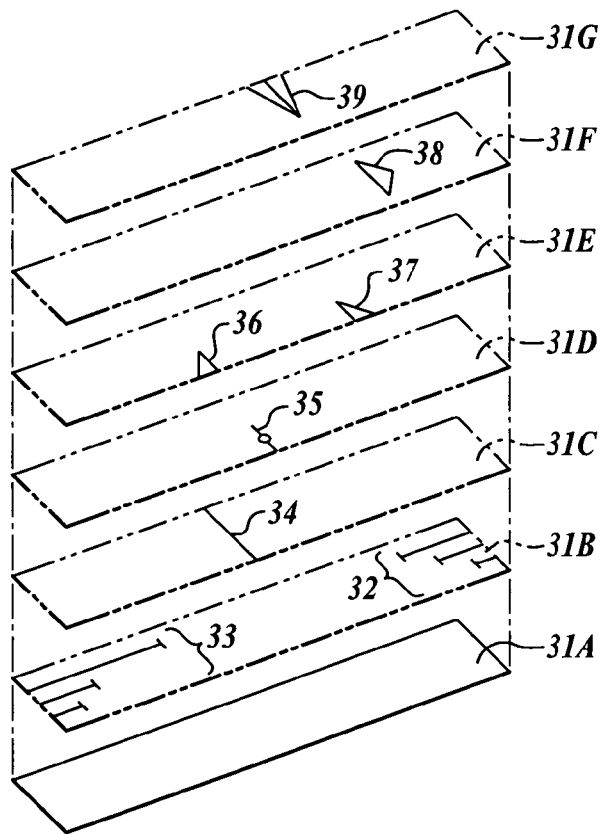
FIG. 3B depicts an exploded view of the layers comprising the multilayer animated indicator depicted in FIG. 3A in accordance with the present invention.

FIGS. 3A-3B illustrate an exemplary multilayer animated data indicator 30 produced and displayed by the multilayer data animation program 11, in accordance with one embodiment of the present invention. In the illustrated example, the indicator 30 represents complex market price data for a particular stock. FIG. 3A depicts an actual view of the exemplary multilayer animated data indicator 30 as shown to the user, whereas FIG. 3B depicts a logical view. The actual view is that of a composite, two-dimensional, animated visual image, where the image comprises multiple animated or fixed objects that are logically associated with various layers 31A-31G of the indicator 30. The logical view shows the associations of the multiple animated or fixed objects with the various layers 31A-31G of the indicator 30. Each animated or fixed object is itself a visual image generated using programming code as described, for example, in commonly assigned U.S. Pat. No. 6,191,799. Each layer 31A-31G is a virtual layer within a hierarchy of layers in a display of the indicator 30, providing a logical third dimension to an otherwise two-dimensional display.

FIG. 3B, depicting the logical view, shows that the exemplary multilayer animated data indicator 30 comprises 12 animated and fixed objects variously associated with one of seven different layers 31A-31G. For example, layer 31B has six objects, including three t-bar downs 32 of varying lengths, and three t-bar ups 33 of varying lengths. These objects become longer or shorter in length to represent advancing or declining data. Layer 31E has two objects—a down triangle 36 and an up triangle 37—each of which represents separate changing data. Layers 31C, 31D, 31F, and 31G, on the other hand, have just one object each—layer 31C having a fixed line 34 representing data that is not changing, essentially a zero point in relation to other objects on other layers; layer 31D having a fixed line with dot 35 representing data that is also not changing; layer 31F having an upward arrow 38 representing data that is changing; and layer 31G having a double triangle 39 also representing data that is changing. Each object represents part of the data for the market price of an actively traded stock. For example, in the exemplary indicator 30 in FIGS. 3A-3B, the t-bar down objects 32 represent historical lows in the market price of the stock, whereas the t-bar up objects 33 represent the historical highs.

In some embodiments, a layer 31A-31G is associated with no animated objects, such as in layer 31A, but rather forms the scale and/or background color of the indicator 30. For an example of scale, as shown in FIG. 3B, the longer, vertically disposed sides of layer 31A may represent the market price. The objects in the remaining layers 31B-31G are interpreted in relationship to layer 31A. Thus, the end positions of the three t-bar down objects 32 in layer 31B may represent the scaled values of the historical market price lows, such as yesterday's low, the ten-day low, and the 52-week low, respectively. Likewise, the end positions of the three t-bar up objects 33 may represent the scaled values of the historical market price highs, such as yesterday's high, the ten-day high, and the 52-week high, respectively. The resulting pattern formed by the ending positions of the t-bars relative to the scale represented by layer 31A quickly gives the user an easily accessible visual sense of the stock's historical performance and volatility.

When a layer forms the background color, the color may vary to reflect changes in the market performance of the stock. For example, the intensity or shade of color may indicate the percentage change in the market price or the volume of shares traded since the market opened, allowing the user to see at a glance which indicators 30 represent stocks that are particularly interesting or volatile.

In another embodiment, the rank of each layer 31A-31G within the hierarchy of layers indicates the level of importance of the data represented by the objects residing on that layer. The level of importance governs the display priority within a given indicator. In one embodiment, the objects representing the most important data are associated with the upper layers, whereas the objects representing the less important data are associated with the lower layers. For example, objects representing important data on upper layers are given a higher display priority than objects representing less important data on lower layers. It should be understood that any ranking of layers may be designated as the hierarchy for a particular indicator without departing from the scope of the claims that follow. Moreover, the level of importance of a layer 31A-31G may vary from one indicator to the next, and is governed by display priorities specific to the type and pieces of data that the indicator and objects represent in conjunction with the purpose of the indicator from the viewer's point of view.

For example, for the indicator 30 illustrated in FIGS. 3A-3B, the type of data is market price data for a particular stock, and one purpose of the indicator is to allow a viewer/investor to quickly assess the current price of the stock relative to other historical data. Therefore, the uppermost layer, layer 31G, holds the most important object, namely, the object representing the current market price 39, whereas the middle layers, layers 31B-31F, hold less important, i.e., less volatile objects, such as the t-bar objects representing the historical highs and lows. The bottommost layer, layer 31A, has no objects, but rather represents the scale of the market price used to interpret layers 31B-31G. In some embodiments, the layer itself may function as an object to represent data by varying an overall aspect of the layer, such as the layer's background color or intensity to reflect changes in the data.

The multilayer animated data indicator program 11 monitors each layer of the indicator 30 at certain predefined intervals, such as a display interval and/or a data monitoring interval. A display interval is a period of time after which the objects on a layer are regenerated to reflect any changes that may have occurred in the appearance of the objects since the last interval. The display interval may be predefined for any of the levels in a given indicator, or may be set by the user to update the display of any or all of the levels of the indicator at a desired frequency. A data monitoring interval is a period of time after which data from a data source 20 is refreshed, and may vary according to the type of data being monitored, e.g., stock prices, temperature, etc., or the desires of a user. Changes in the data are reflected in changes to some of the objects, i.e., the animated objects, which in turn, may result in changes to the appearance of those objects and thus, the multilayer data indicator, the next time they are displayed. Each layer may have different display and/or data monitoring intervals, depending on the objects present on that layer.

After each interval, the multilayer animated data indicator program 11 determines which, if any, objects on which layers 31A-31G of an indicator 30 have changed, and whether any resulting changes to the appearance of the objects on one layer will conflict with the display of another object on another layer. Conflicts arise where the simultaneous display of objects comprising an indicator 30 results in images that occupy the same area or portion of the area of the visual display, i.e., images that overlap.

In one embodiment, the multilayer animated data indicator program 11 resolves such conflicts by superimposing the display of those objects associated with the more important layers over those objects associated with the less important layers. As a consequence, the program 11 may obscure all or a portion of those objects on the less important layers.

In the illustrated example, the triangle object representing the current market price 39 is on uppermost layer 31G, and may therefore obscure a portion of the objects on the lower layers 31A-31F. For instance, when the value for the current market price is sufficiently close to the value of the opening, ask, and bid prices, the current market price object 39 may obscure a part of the fixed opening price line object 34 on layer 31C, or the ask and bid price triangle objects 36 and 37 on layer 31E.

In other embodiments, the conflicts are resolved by changing the appearance of the objects in question short of obscuring them. For example, in one embodiment, the program 11 resolves conflicts by reducing the size, intensity, opacity, or changing the color of those objects on the less important layers to lessen their visual impact during the period of conflict. Conversely, in other embodiments, the program 11 resolves conflicts by increasing the size, intensity, opacity, or changing the color of those objects on the more important layers to emphasize their visual impact during the period of conflict. Other graphical display techniques to resolve conflicts by changing the appearance of the objects in question may be used without departing from the scope of the claims that follow.

Although the illustrated embodiment in FIGS. 3A-3B has layers similar in size and position to other layers in the indicator 30, other embodiments may employ layers 31A-31G of different size and position without departing from the subject matter of the claims that follow. In one embodiment, the overall boundary, shape, and order of importance of the layers 31A-31G of any given indicator is programmatically predefined. Nevertheless, the layers may shrink or grow to accommodate the display of objects as they are updated to reflect changes in the data being represented.

Likewise, the order of importance of the layers may be changed to accommodate the display of objects as they are updated to reflect changes in the data being represented. For example, depending on the design objectives of a particular indicator 30, an object may be initially associated with a lower layer and thus obscured during periods of conflict. When the data that the object represents reaches a certain threshold, the object would "emerge" from obscurity by being elevated to one of the higher layers. For instance, using the illustrated indicator 30 in FIGS. 3A-3B, if a stock price falls to a predetermined sell-off price, i.e., the "threshold" value, the indicator 30 may be changed on the fly to elevate the importance of the ask and bid prices in objects 36 and 37 by moving them from layer 31E to layer 31F.

It will be appreciated from FIGS. 3A and 3B that layering objects for simultaneous display in a multilayer animated data indicator 30 provides the viewer with an immediate indication of how different pieces of complex or interrelated data are performing relative to each other, i.e., the indicator provides the viewer with knowledge and not just information. In the example depicted in FIGS. 3A-3B, in which objects representing various aspects of current and historical market price data are layered in a multilayer indicator, the viewer knows at a glance how a particular stock is performing relative to past market performance and/or the viewer's own market position. This knowledge gives the viewer the ability to quickly make intelligent financial decisions.

Figure 4A:
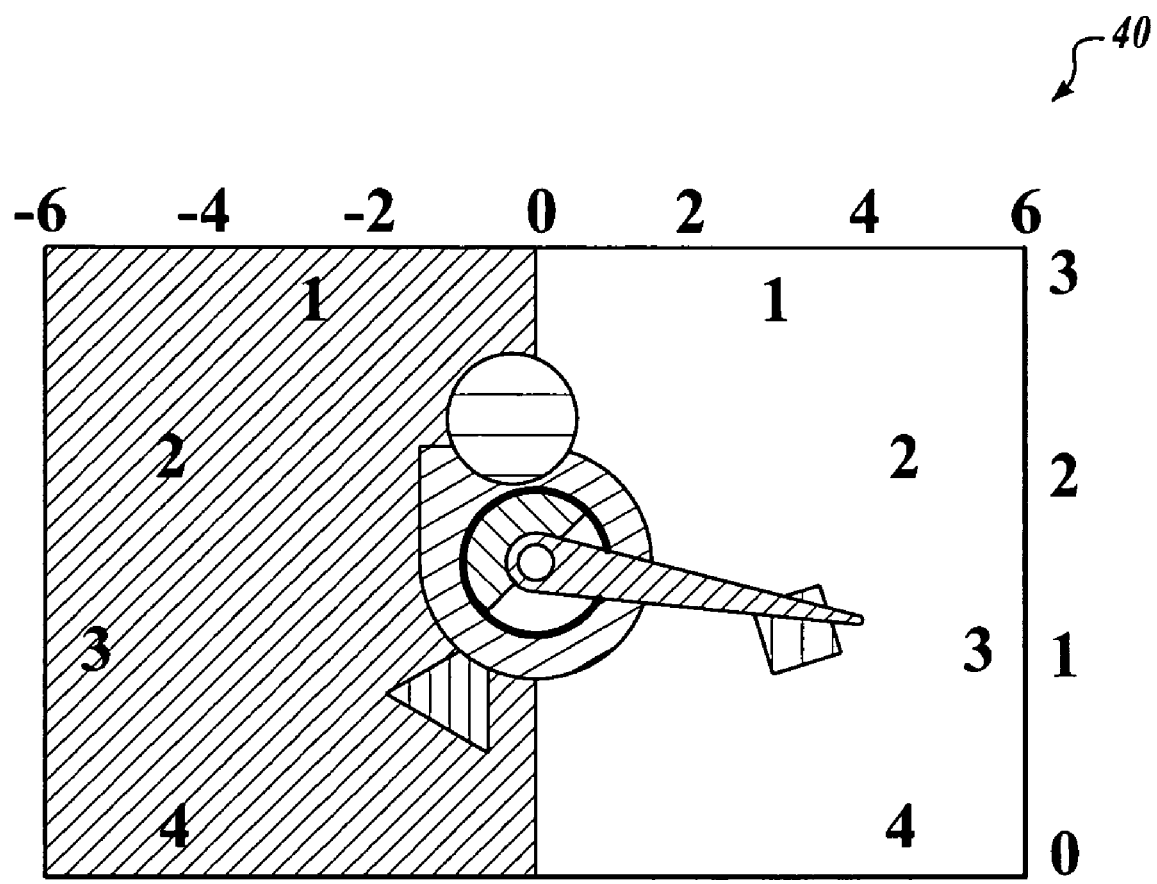
FIG. 4A depicts an actual view of another representative multilayer animated indicator having objects that are displayed in accordance with the present invention.
Figure 4B:
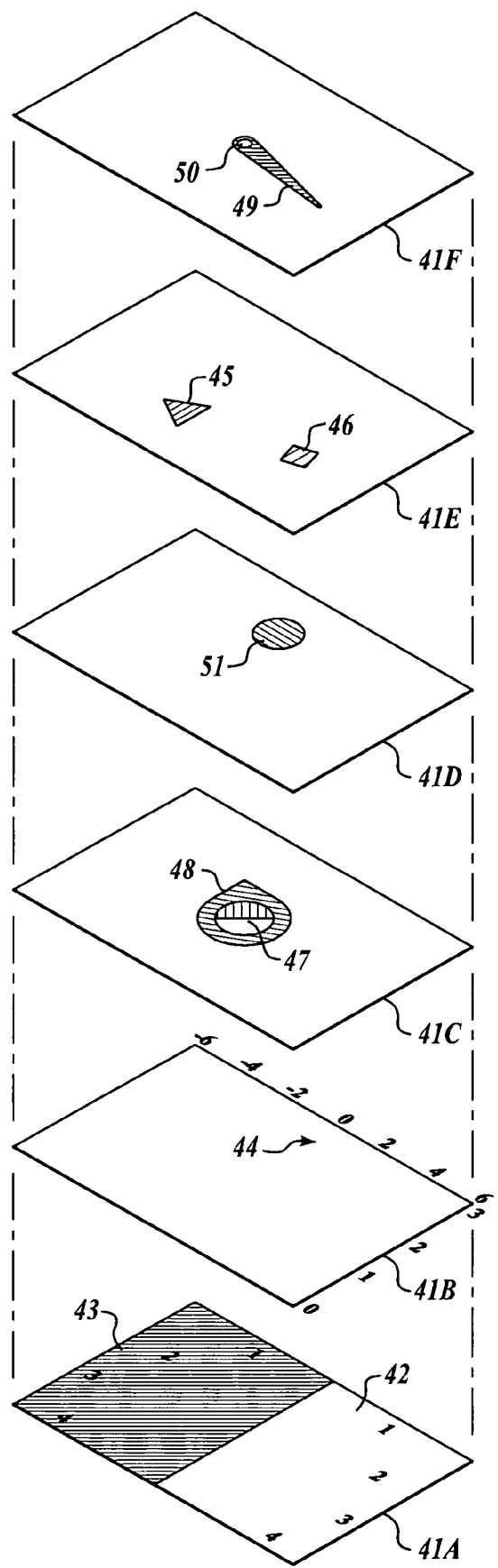
FIG. 4B depicts an exploded view of the layers comprising the multilayer animated indicator depicted in FIG. 4A in accordance with the present invention.

FIGS. 4A-4B illustrate another exemplary multilayer animated data indicator 40 produced and displayed by the multilayer data animation program 11, in accordance with one embodiment of the present invention. In the illustrated example, the indicator 40 represents the status and performance of an express airfreight flight. Similar to the indicator 30 illustrated in FIGS. 3A-3B, FIG. 4A depicts an actual view of the exemplary multilayer animated data indicator 40, as shown to the user, whereas FIG. 4B depicts a logical view.

FIG. 4B, depicting the logical view, shows that the exemplary indicator 40 comprises nine animated and fixed objects variously associated with one of six different layers 41A-41F. For example, layers 41C and 41F taken together have four objects that are stacked near the center of the indicator and rotate around a common central point. Layer 41C has two objects, including a wide rotating pointer 48 surrounding a rotating half circle 47 in a contrasting shade. Layer 41F has two objects, including a narrow rotating pointer 49 surrounding a contrasting dot 50. Layer 41A also has two objects, a leftmost semicircular scale 43 from 1-4 set against a shaded background, and a rightmost semicircular scale 42 from 1-4 set against a contrasting background. Together, the scales 43 and 42 comprise a dial having scaled values to which the rotating pointers 48 and 49 may point. In the airfreight example, the scaled values are numbers that represent the hours that a flight is behind or ahead of its scheduled arrival time; numbers to the left in scale 43 are hours behind schedule, and numbers to the right in scale 42 are hours ahead of schedule. Each of the objects may change over time to represent changes in the data. For example, the contrasting dot 50 may change color or intensity to represent changes in data, and the half circle 47 may alter speed or attitude to represent changes in data.

In the airfreight example, the half-circle object 47, wide rotating pointer object 48, narrow rotating pointer object 49, and contrasting dot object 50, each relates to the on-time status of a particular flight. For instance, the wide rotating pointer 48 and narrow rotating pointer 49, each points to the numbers on the dial formed by the scales 43 and 42 to indicate the status of an airfreight flight. The wide pointer 48 indicates the performance of the flight crew's previous flight, i.e., the actual arrival time relative to the scheduled arrival time, whereas the narrow pointer 49 indicates the estimated time of arrival of the current flight relative to the scheduled arrival time. In the example, with reference to the actual view of the indicator 40 illustrated in FIG. 4A, it is apparent at a glance at indicator 40 that the pointer objects 48 and 49 indicate that the previous flight was one hour late, whereas the current flight is three hours ahead of schedule. The narrow pointer 49 may also vary in color to indicate the current flight's readiness status, e.g., red when prior to loading, yellow during loading and preflight, and green when cleared for take-off.

In the illustrated example, the half circle object 47 represents the financial burn rate of the current flight in preparation or in progress. For instance, data such as the number of employees needed to load the flight, the cost of and amount of fuel needed to complete the flight, and the time required to prepare the flight are compiled and compared to company standards. If the flight is perfectly equal to company standards, the object is static. For every percentage point the flight exceeds company standards, the object rotates one revolution per minute clockwise, and vice versa if the flight lags behind standards. Thus, it is possible to determine at a glance at the indicator 40 that a particular flight has a substandard high financial burn rate by simply observing whether the half circle 47 is rotating counter-clockwise, and if so, how fast.

In the indicator 40, the contrasting dot object 50 represents the level of flight status data reliability. The contrasting dot 50 changes color on a continuum from white for unreliable, to bright green for very reliable. Factors such as rapidly changing weather and lack of crew contact decrease reliability, while predictable weather and confirmed crew health and presence increase data reliability.

Continuing with the description of the layers of indicator 40, layer 41D has one object, a floating circle 51, and layer 41E has two floating objects, a triangle 45 and a square 46. Layer 41B has no objects per se, but rather embodies a vertical scale from 0 to 3, and a horizontal scale of plus 6 to minus 6, which together comprise a scale calibration object 44. The floating objects 51, 45, and 46 correlate to the scale calibrations of calibration object 44, and are each displayed in a contrasting shade to help differentiate one from another should they happen to overlap. In the airfreight example, the horizontal scale of calibration object 44 relates to flight profitability. A floating object positioned near the zero end of the horizontal scale indicates a break-even status, while an object positioned near the plus-six end would indicate a six percent profit. The vertical scale of calibration object 44 represents the average priority level of the flight's cargo, such that a floating object positioned at the highest level three would indicate a cargo of all top priority packages, and an object positioned at zero would indicate a cargo of lowest priority shipments. In the illustrated example, the circular floating object 51 indicates that the current flight is projected to lose about 0.25% of the flight's cost and contains packages with an average priority level of about two. The triangular floating object 45 indicates the average profit and priority levels for all flights in this particular flight pattern. In this example, it appears from glancing at the overall appearance of the indicator 40 that the flights in this particular flight pattern appear to be unprofitable and have an average priority level of less than one. The square floating object 46 indicates that the company-wide average for flight profitability is about 2.5 percent, and average priority level is about one.

Note that although the triangular and square objects 45 and 46 are on the same level, they may be semitransparent in appearance, so can overlap so that both objects are still completely visible. If so desired, objects on some other levels may obscure them while objects on still others levels may allow them to remain always visible, though semitransparent. Depending on the design objectives for indicator 40, floating objects 45 and 46 may be associated with lower layers so that they are obscured by the centrally located objects 47, 48, 49, and 50 on the layers 41C and 41F. For example, if the indicator 40 represented market data and the floating objects 45, 46, and 51 were to represent particular stocks that gain or lose a sufficient percent of value or trade at a sufficient volume, then the objects might be assigned to the highest layer 41F (or, conversely, the centrally located but conflicting objects 47, 48, 49, and 50 might be assigned to lower layers) to allow the floating objects to "emerge" from obscurity, since those stocks might then be considered of interest to the viewer.

In yet another example, the floating objects 45 and 46 may be persistent and semitransparent, and therefore always visible no matter what layers are above or below. In an alternate implementation, the semitransparent objects may be purposefully partially obscured by objects on higher layers, but through which objects on lower layers may remain visible. Numerous other permutations of object characteristics may be employed in the indicators 30/40 without departing from the scope of the claims that follow. In the example illustrated in FIGS. 4A-4B, for example, the numerical scales 42 and 43 that comprise the dial, and the calibration scale 44 may change to accommodate values that exceed the default display values. Layer 41B may also display an object that represents a map that locates the plane always at the map's center, using the flight's geographical positioning satellite (GPS) data.

In the airfreight flight example, the data that drives indicator 40, as illustrated and described above in FIGS. 4A-4B, is drawn from several different sources—the sorting station, the loading dock, the employee time records, the fuel dock, the flight deck, air traffic control, and the weather service. All of this data may be routed to a central computer and updated every few minutes. Consequently, the layers of the indicator 40 may be initialized with a frequent data monitoring interval and display update interval, as will be described in further detail below with reference to FIGS. 5A-5D, and 6.

FIGS. 5A-5D and FIG. 6 are flow diagrams depicting the overall logic used by the multilayer data animation program 11 to control the simultaneous display of objects that represent data using a multilayer animated indicator. Since several types of data may be simultaneously monitored and graphically depicted using several multilayer animated indicators, it will be appreciated that the logic shown in FIGS. 5A-5D and FIG. 6 is simply repeated for each indicator.

Figure 5A:
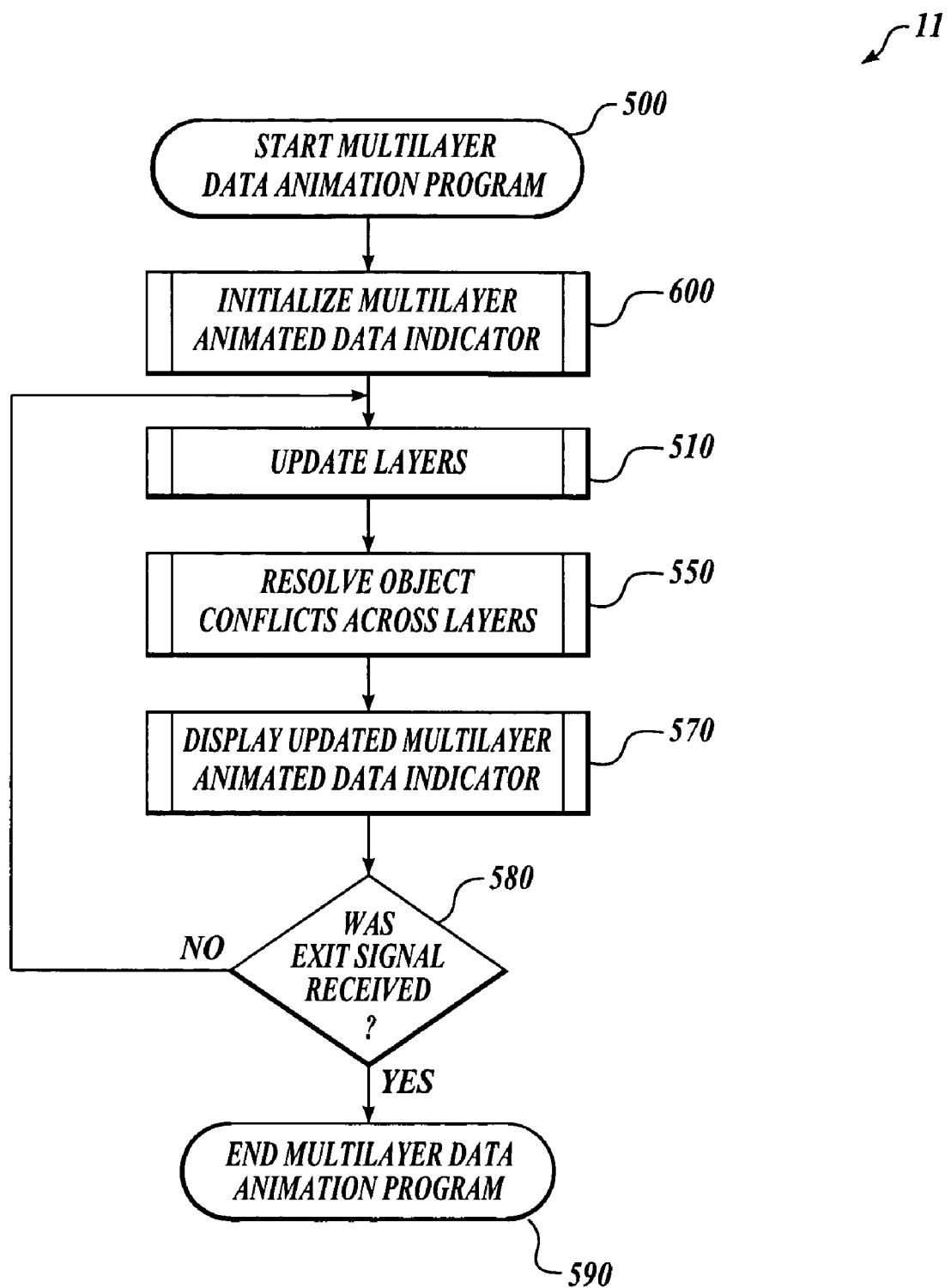
FIGS. 5A-5D are flow diagrams illustrating the logic used by the server to control the simultaneous display of multiple objects using a multilayer animated indicator in accordance with the present invention.
Figure 6:
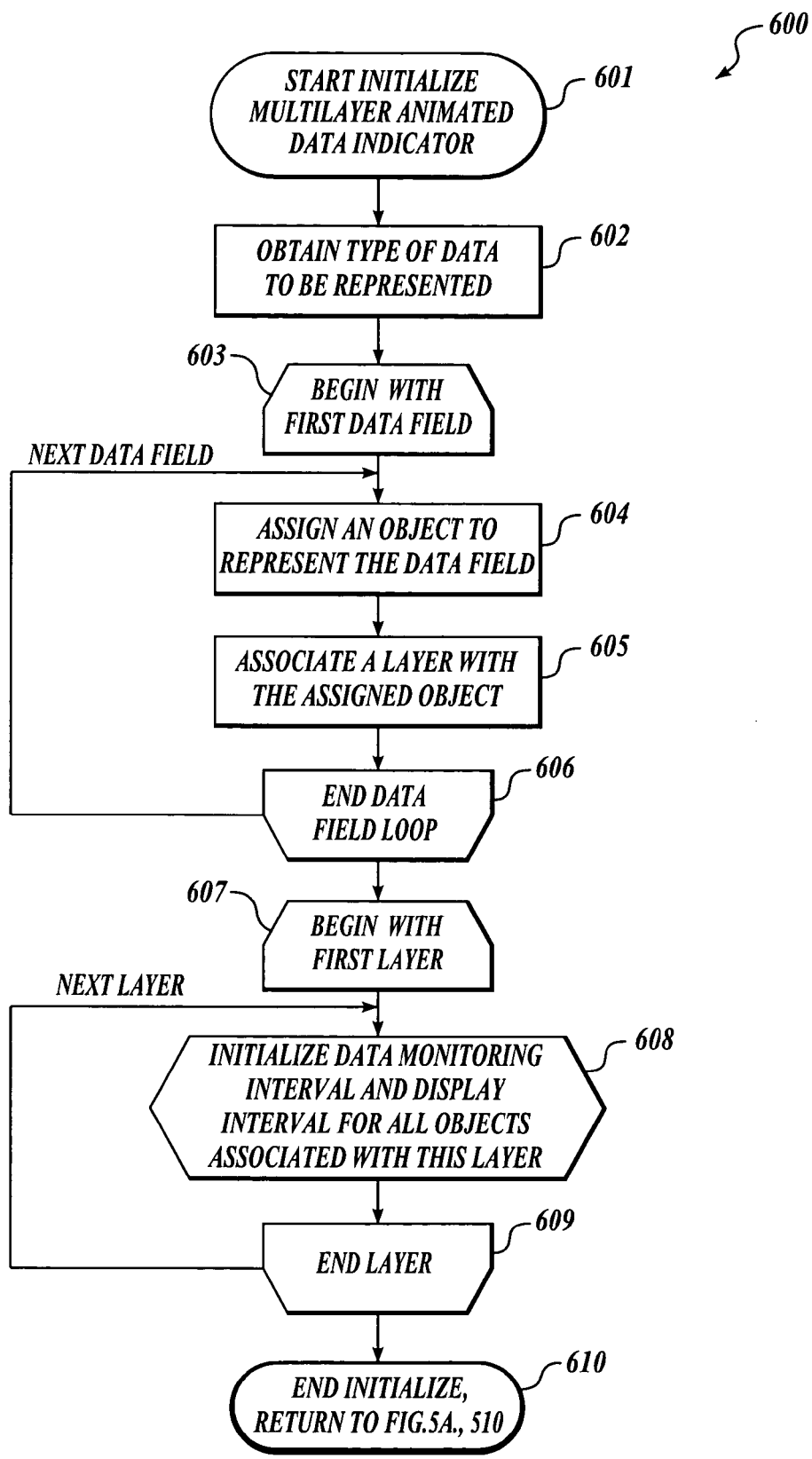
FIG. 6 is a flow diagram illustrating the logic used by the server to initialize the multilayer animated indicator in accordance with the present invention.

The logic begins in FIG. 5A in block 500 and proceeds to block 600. In block 600, depicted in further detail in FIG. 6, an initialization routine is performed to initialize the default values used by the multilayer data animation program 11 to display a multilayer animated data indicator 30/40 for the first time. With reference to FIG. 6, the initialization routine logic begins in a block 601 and proceeds to block 602, where the multilayer data animation program 11 obtains the type of data to be represented. The process of obtaining the type of data to be represented may be preprogrammed or may be determined by the user. For example, in one embodiment of the present invention, the multilayer data animation program 11 prompts a user of the client computer 13 for the type of data to be represented. For instance, if the data source 20 provides stock market data for all publicly traded stocks on the NYSE, the user may select which stock is to be represented. In yet other embodiments of the present invention, the user of the server 10 can define a list of data types from which the user of the client 13 may choose, or the user of the client 13 can select or input the type of represented data directly. Exemplary logic for obtaining the type of data to be represented is described in detail in commonly assigned U.S. Pat. No. 6,191,799.

Once the type of data has been selected by the user or otherwise determined, processing continues at block 603. Block 603 indicates the start of a logic loop that is repeated for each piece of data that is available for the selected data type, referred to here as a data field. When the user wishes to include a particular data field for display in the multilayer animated data indicator 30/40, the data field must be represented by an appropriate object. For example, the assigned object should have appropriate range, motion, or other characteristics that are adequate to fully represent the value of the data field. At block 604, processing continues with the multilayer data animation program 11 assigning an appropriate object to represent the data field. The process of assigning an object to represent the data field may be pre-programmed or may be determined by the user. For example, in one embodiment of the present invention, the multilayer data animation program 11 prompts a user of the client computer 13 to assign an object to represent each piece of data relating to the selected stock that the user wishes to view. For instance, the user of the server 10 can define a list of objects from which the user of the client 13 may choose, or the user of the client 13 can select or input the assigned object directly.

At block 605, processing continues with the multilayer data animation program 11 further selecting which layer 31A-31G/41A-41D of a multilayer animated data indicator 30/40 to associate with the assigned object. The selected layer 31A-31G/41A-41D should have appropriate display and monitoring intervals to accommodate the frequency with which the user wants to refresh the display of the objects and the volatility of the data being represented. For example, where the design objective for the indicator 30/40 is to display the current market price and volume of a particular stock in relation to the historical market data for that stock, then the program 11 would assign the more volatile objects representing the current price and volume data to a layer or layers 31A-31G/41A-41D having more frequent display and data monitoring intervals, and the more static objects representing the historical data to a layer or layers having less frequent display and data monitoring intervals.

The process of selecting which layer 31A-31G/41A-41D of a multilayer animated data indicator 30/40 to associate with an assigned object may be preprogrammed or may be determined by the user. For example, in one embodiment of the present invention, the multilayer data animation program 11 prompts a user of the client computer 13 to select a layer to associate with an object. The user of the server 10 can define a list of layers 31A-31G/41A-41D for the assigned objects of a particular indicator 30/40 from which the user of the client 13 may choose, or the user of the client 13 can input the designated layer 31A-31G/41A-41D of an indicator 30/40 directly. For instance, if the data source 20 provides stock market data for all publicly traded stocks on the NYSE, the user may make a selection that current market price data field is to be represented by a floating triangle object associated with layer 31G, while the data field for the prior day's low price is to be represented by a t-bar up object associated with layer 31B. The logic loop to assign an object to represent that data fields and associated the object with a layer concludes at block 606. An example of a multilayer data animation program 11 prompting a user of the client computer 13 to assign objects and associate layers is depicted and described in further detail below in FIG. 31G and FIGS. 8A-8C.

Block 608 indicates the start of another logic loop that is repeated for each layer in the multilayer animated data indicator 30/40 to complete the initialization routine 600. At processing block 609, the multilayer data animation program 11 completes the initialization of the indicator 30/40 by initializing the display and data monitoring intervals for each of the assigned objects comprising the indicator 30/40. The intervals for each assigned object are conformed to the display and data monitoring intervals for the layer 31A-31G/41A-41D with which the object has been associated, so that the initial data update and the initial display update occur at the proper time. Block 610 indicates the end of the layer logic loop. After all of the layers have been processed, the initialization routine concludes at block 611, and processing control is returned to processing block 510 in FIG. 5A. An exemplary process of completing the initialization of each of the assigned objects comprising the indicator 30/40 is described in detail in commonly assigned U.S. Pat. No. 6,191,799.

Figure 5B:
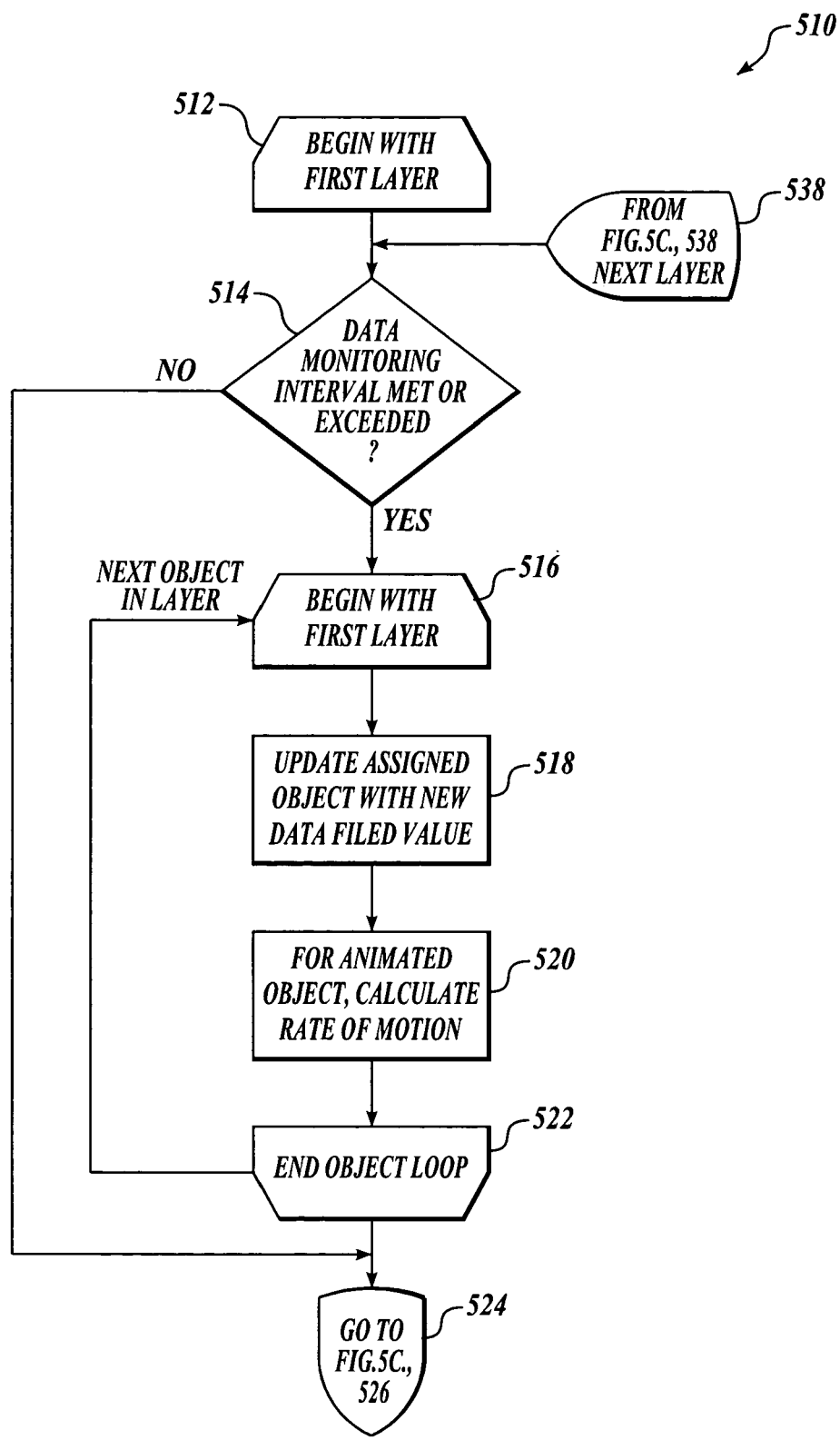

Returning to FIGS. 5A-5D, after the initialization routine 600 has been performed, the multilayer data animation program 11 proceeds to process block 510 to update the layers 31A-31G/41A-41D of the indicator 30/40 using the latest data values for the data fields that are available from the data source 20. Process block 510 is depicted in further detail in FIGS. 5B-5C. With reference to FIG. 5B, block 512 indicates the start of a logic loop that is repeated for each layer 31A-31G/41A-41D of the indicator 30/40. At decision block 514, the multilayer data animation program 11 determines whether the data monitoring interval of the layer has been met or exceeded.

When the data monitoring interval of the layer has been met or exceeded, processing continues at block 516 to monitor those data fields from data source 20 that are represented by objects associated with that layer. Specifically, when the layer's data monitoring interval has expired, the new data values of the monitored data fields are used to update the corresponding assigned objects that graphically represent those data fields at block 518 in the logic loop beginning in block 516. In addition, for those objects that are animated, the rate and direction of motion for each of the objects is calculated in block 520. The logic loop ends at block 522 and is repeated for each assigned object associated with that layer. Exemplary logic used to monitor the data fields, update objects, and to calculate the rate of motion for an object is described in more detail in commonly assigned U.S. Pat. No. 6,191,799.

Figure 5C:
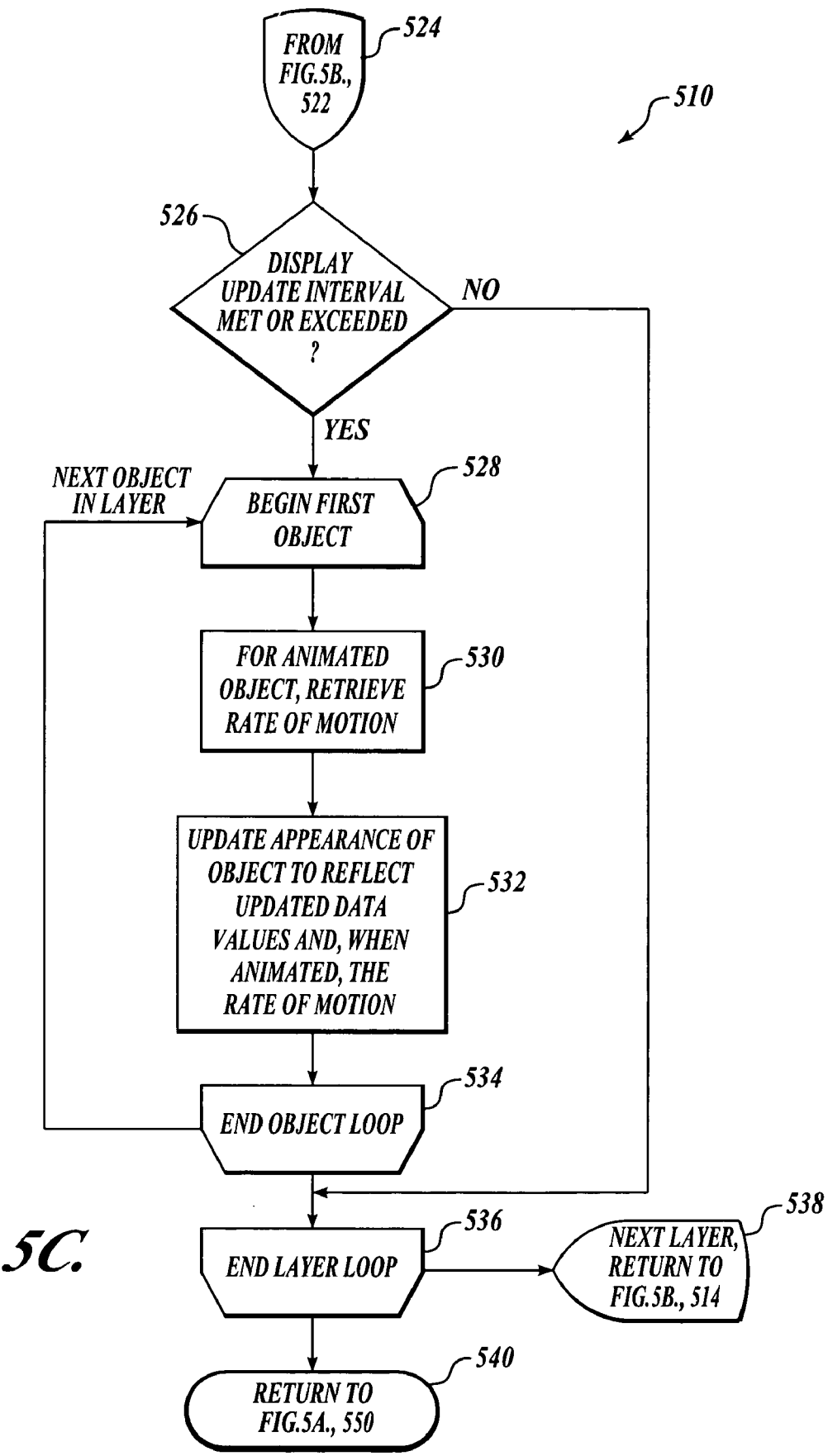

Once all of the assigned objects in a layer have been updated with their new data field values and their rates of motion calculated, or when the data monitoring interval has not yet been met or exceeded, processing continues in FIG. 5C at decision block 526. At decision block 526, the multilayer data animation program 11 determines whether the display update interval for the layer being processed has been met or exceeded. The display update interval may be longer or shorter than the data monitoring interval, and is primarily used to insure that the appearance of animated objects is timely refreshed in accordance with their rates of motion, even when their underlying data values have not yet changed.

When the display update interval for the layer being processed has been met or exceeded, processing continues at block 528 to begin a logic loop to process each object associated with the layer. At processing block 530, when the object is animated, the rate of motion, previously calculated at processing block 520 in FIG. 5B, is now retrieved from mass memory 14 of the server 10 to determine whether it is necessary to alter the appearance of the object since the display update interval has expired. At processing block 532 the appearance of the object representing the monitored data is altered to reflect any updates that were made at block 518 in FIG. 5B, as well as to reflect the rate of motion. Exemplary logic used to alter the appearance of the objects to reflect new data values as well as the rate of motion of animated objects is described in detail in commonly assigned U.S. Pat. No. 6,191,799.

When the display update interval has not been met or exceeded, it is not yet necessary to alter the appearance and update the display of the object. Accordingly, the program logic branches to the end of the layer loop at block 536 to process the next layer at block 538, or after all layers have been processed, to resume processing at process block 550 of FIG. 5A.

Figure 5D:
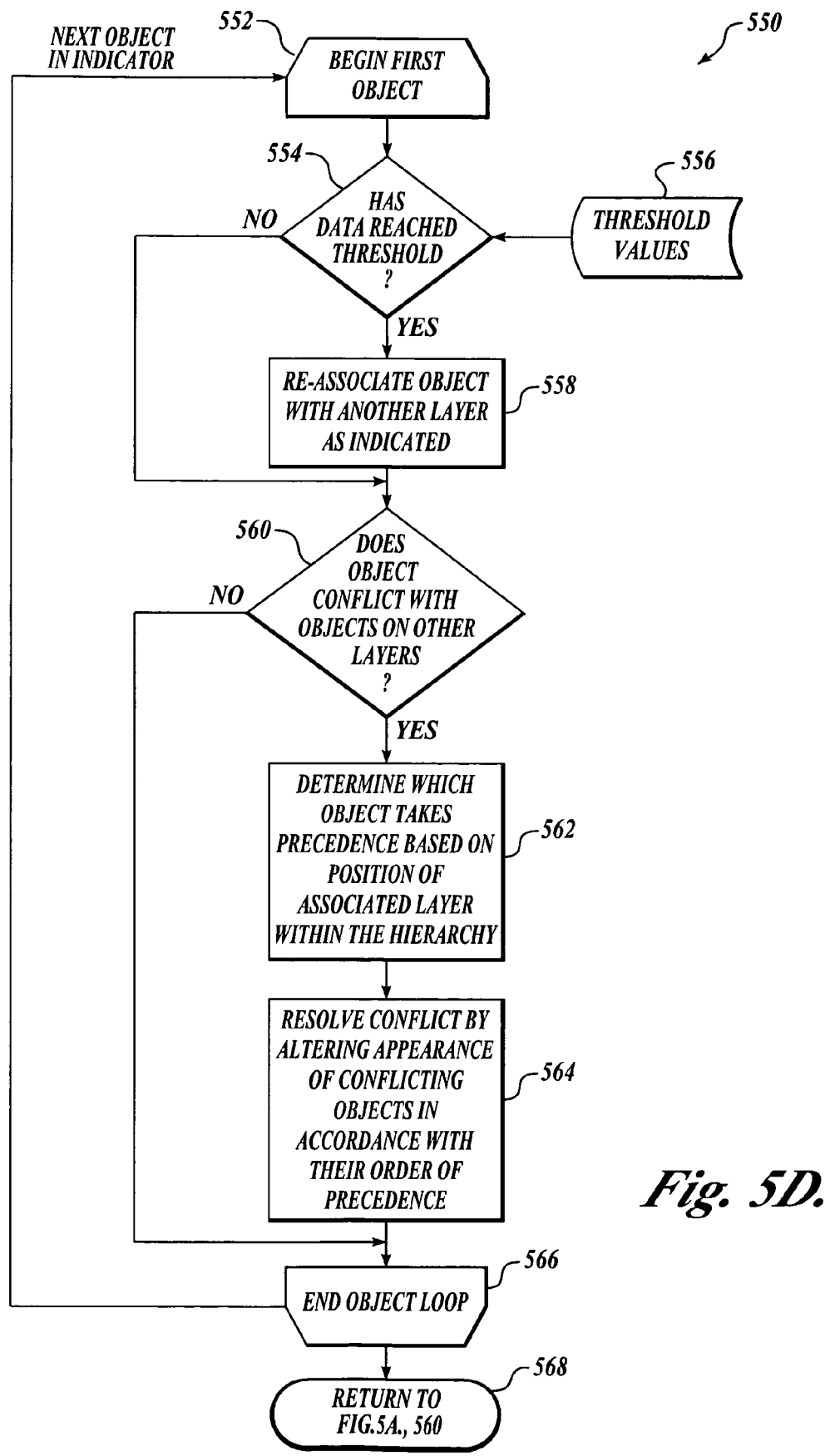

In block 550 of FIG. 5A, depicted in further detail in FIG. 5D, a conflict resolution routine is performed to resolve any conflicts between objects prior to displaying the indicator 30/40 to the user. The conflict resolution routine provides the multilayer data animation program 11 with the ability to control the simultaneous display of all of the objects comprising the multilayer animated data indicator 30/40 in accordance with the relative importance of the objects based on their association with one of the layers 31A-31G/41A-41D of the indicator 30/40. With reference to FIG. 5D, the conflict resolution routine logic begins in a block 552, which indicates the start of a logic loop that is repeated for each object of the indicator 30/40. Before determining whether a conflict exists, the multilayer data animation program 11 first proceeds to decision block 554 to determine whether the updated data value for the data field that the object either represents or is related to has met or exceeded a threshold value 556. The threshold value 556 is a stored value previously specified by a user or programmatically determined when the multilayer data animation program 11 initially generates the indicator 30/40.

In one embodiment, the threshold value 556 for a particular object is a value of the data field that the object itself represents. For example, the user may wish to relegate the object representing the current market price of a particular stock to a lower level until such time as the price reaches a certain threshold value of interest to the user (e.g., elevate the current market price object when the price reaches $60 per share). In other embodiments, the threshold value 556 for a particular object is a value for a rate at which the value of the data field is changing, or a value for some other data field that is related to the data field that the object itself represents. After reaching the threshold value 556, the object representing the data field is re-associated with a different layer in the hierarchy (higher or lower) to better represent the data field in the multilayer animated data indicator 30/40. For example, the user may wish to relegate the object representing the current market price of a particular stock to a lower level until such time as the trading volume in that stock reaches a certain value of interest to the user (e.g., elevate the current market price object when the current day's trading volume reaches 100 thousand shares). Accordingly, at processing block 558, when the value of the data has reached a threshold value, the object is reassociated with another layer as indicated to reflect the new level of importance of the data field that the object represents.

After processing the threshold values, if any, the multilayer data animation program 11 proceeds to decision block 560 to determine whether the display of an object will conflict with the simultaneous display of any other object in the indicator 30/40. If not, the object is displayed "as is" and the logic of the multilayer data animation program branches to the end of the object loop at block 566. However, should a conflict between objects exist, processing continues at block 562 to determine which of the conflicting objects takes precedence based on the position of the object's associated layer 31A-31G/41A-41D within the hierarchy of layers for this indicator 30/40.

The multilayer data animation program 11 continues at block 564 to resolve the conflict between the objects in the indicator 30/40. In one embodiment, the multilayer data animation program 11 resolves the conflict by obscuring those portions of the display of the object associated with the less important layer in the hierarchy, e.g., the lower layer, with the display of the object associated with the more important layer, e.g., the higher layer. In an alternate embodiment, the multilayer data animation program 11 resolves the conflict by re-ordering the layers in the hierarchy to better represent the data fields of the conflicting objects, as long as such a re-ordering does not cause new conflicts between other objects in the re-ordered or any other layers of the multilayer animated data indicator 30/40. In other embodiments, the conflict is resolved by altering those portions of the display where the conflict arises, i.e., those portions of the display where the conflicting objects are competing for display in the same two-dimensional area. Altering the display may include altering the size, intensity, opacity, color, or any other aspect of one or more of the conflicting objects, typically the object associated with the layer having less importance in accordance with the hierarchy for that indicator.

Once the conflict is resolved, the object loop ends at block 566, and processing is repeated for the next object in the indicator at block 552 until all of the objects have been processed. After all of the objects have been processed to resolve conflicts, processing continues at block 568 to return control to processing block 570 in FIG. 5A.

With reference to FIG. 5A, at processing block 570, the indicator 30/40 is displayed with the obscured or altered portions of objects as a result of conflict resolution performed in block 550. In one embodiment, at block 570 the multilayer animated data indicator 30/40 is transmitted by the server 10 to the appropriate client 13 that requested the multilayer animated data indicator 30/40. In other words, the server 10 generates the program code necessary for controlling the simultaneous display of layered objects in the requested multilayer animated data indicator 30/40 (i.e., the logic described in processes 600, 510, and 550) and stores the information to a file. That file is then transferred to the client 13. Once received, the requested multilayer animated data indicator 30/40 is displayed on the client's display 26. In other embodiments, at block 570 the server 10 does not transfer the requested multilayer animated data indicator 30/40 to the client 13 for display. Rather, at block 570 the server 10 displays the requested multilayer animated data indicator 30/40 itself and alters its appearance as described above in process blocks 600, 510, and 550. In this case, the server 10 might also generate the graphical display commands necessary to display the requested multilayer animated data indicator 30/40 and transfer those commands to the client 13, whereupon the client 13 executes the commands to generate the display for the requester. Of course, it is understood that numerous other techniques may be employed to cause the requested multilayer animated data indicator 30/40 to be displayed on the client 13 without departing from the scope of the claims that follow. For example, in still other embodiments, at block 570 the server 10 might stream the image of the requested multilayer animated data indicator 30/40 to the client 13 for display.

Once the multilayer animated data indicator 30/40 has been displayed, the logic of the multilayer data animation program 11 continues at decision block 580 to determine whether an exit signal (e.g., a system interrupt, user command, etc.) has been received. If so, the multilayer data animation program 11 terminates at block 590; otherwise processing of the multilayer animated data indicator 30/40 is repeated beginning at processing block 510.

FIGS. 7 and 8A-8C depict an exemplary user interface to allow a user to define various aspects of a multilayer animated indicator, including assigning the objects to one of multiple layers of the indicator in accordance with the present invention. It should be noted that the illustrated interface reflects just one embodiment of the present invention, and that other variations of the interface may be employed without departing from the scope of the claims that follow.

Figure 7:
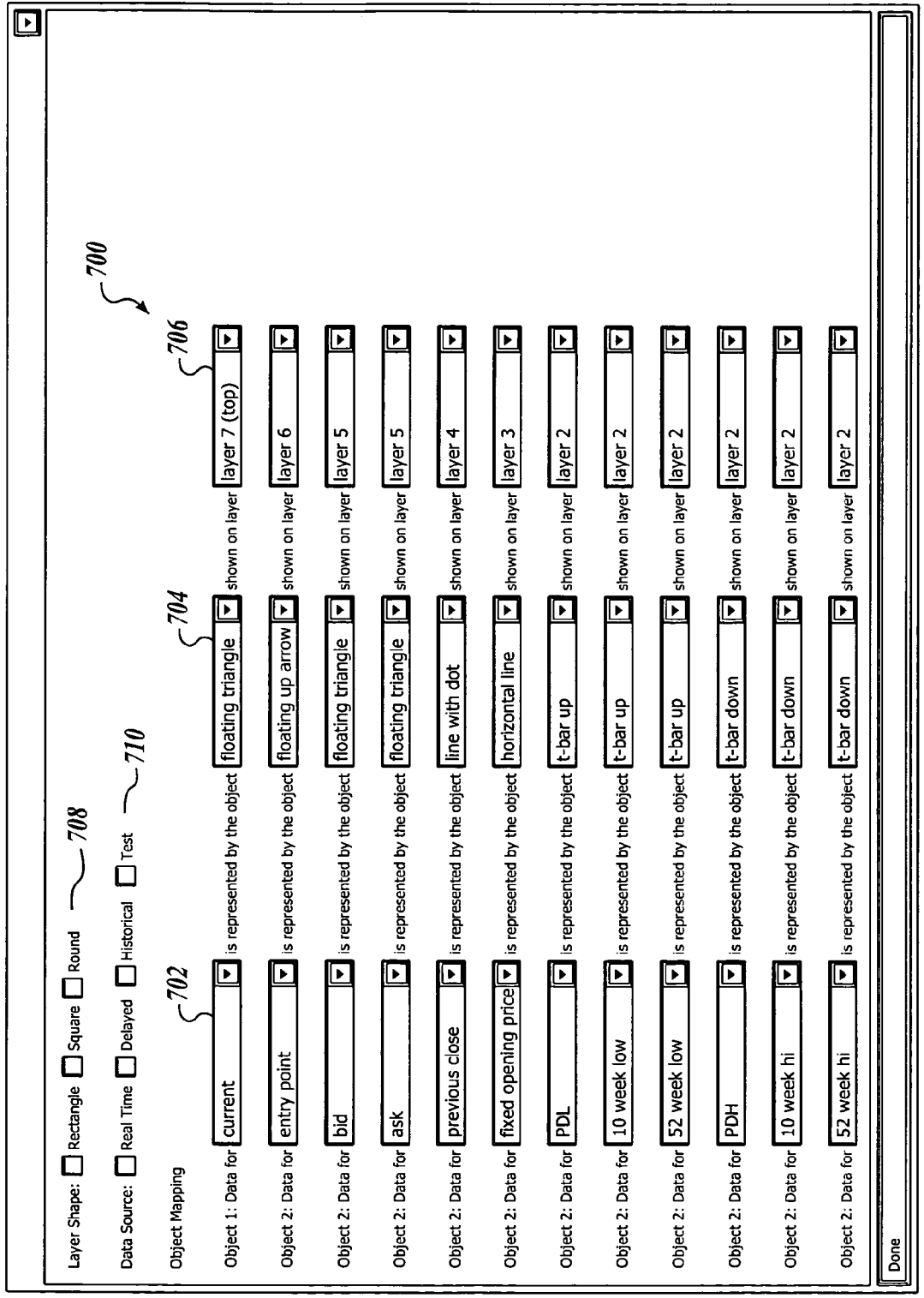
FIGS. 7 and 8A-8C depict an exemplary user interface to allow a user to select the objects that comprise a multilayer animated indicator, and to assign the objects to one of multiple layers of the indicator in accordance with the present invention.
Figure 8A:
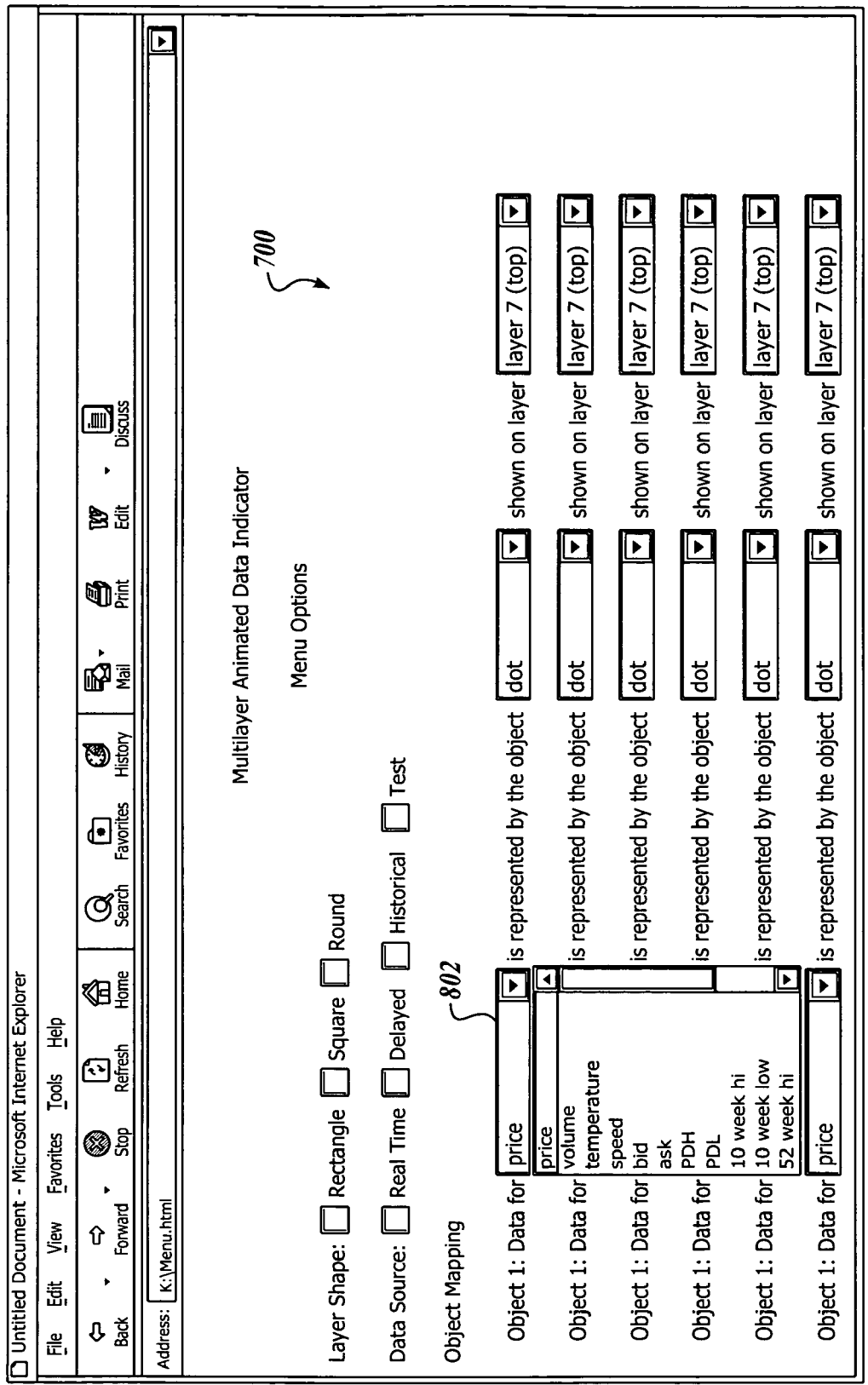
Figure 8B:
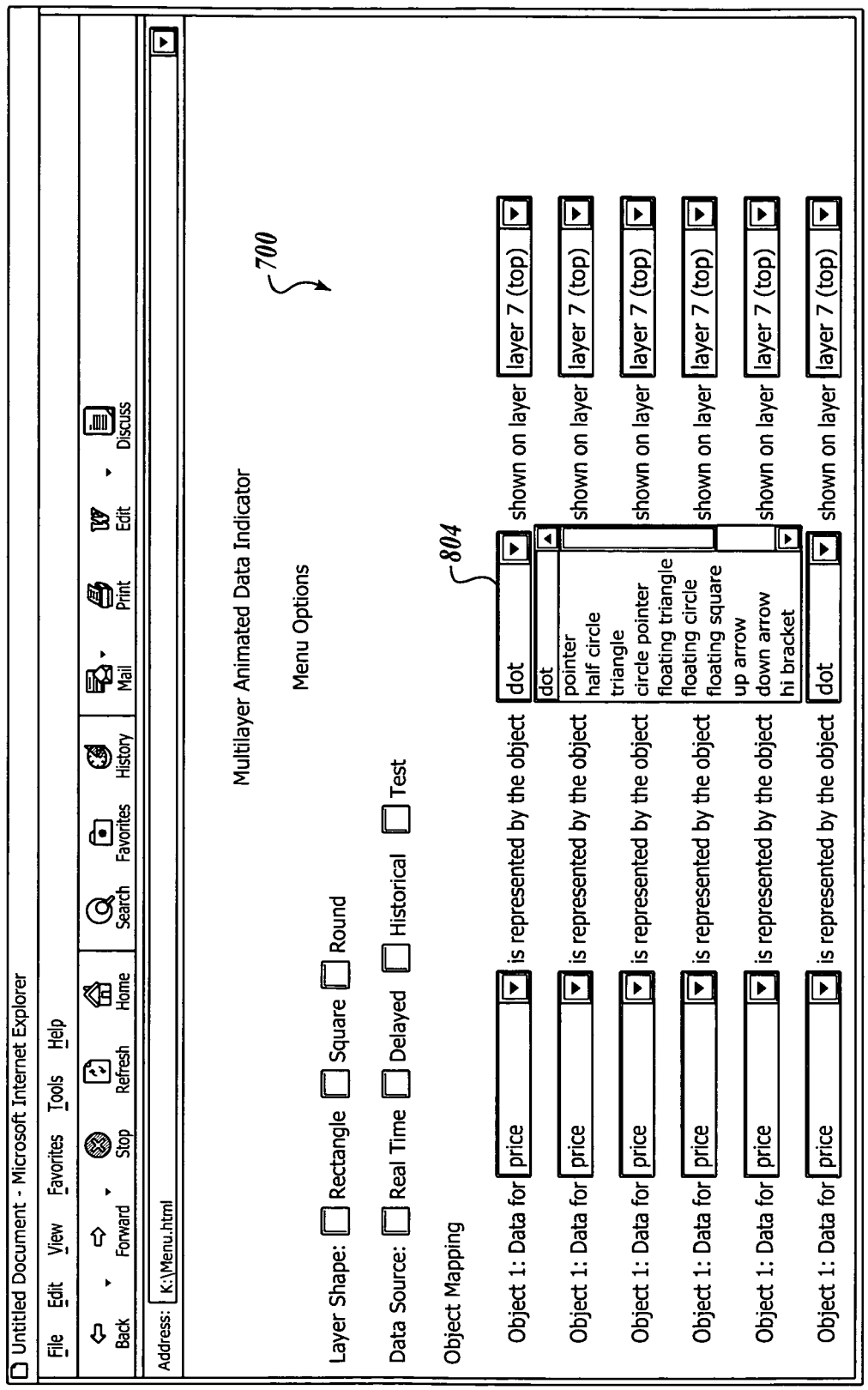
Figure 8C:
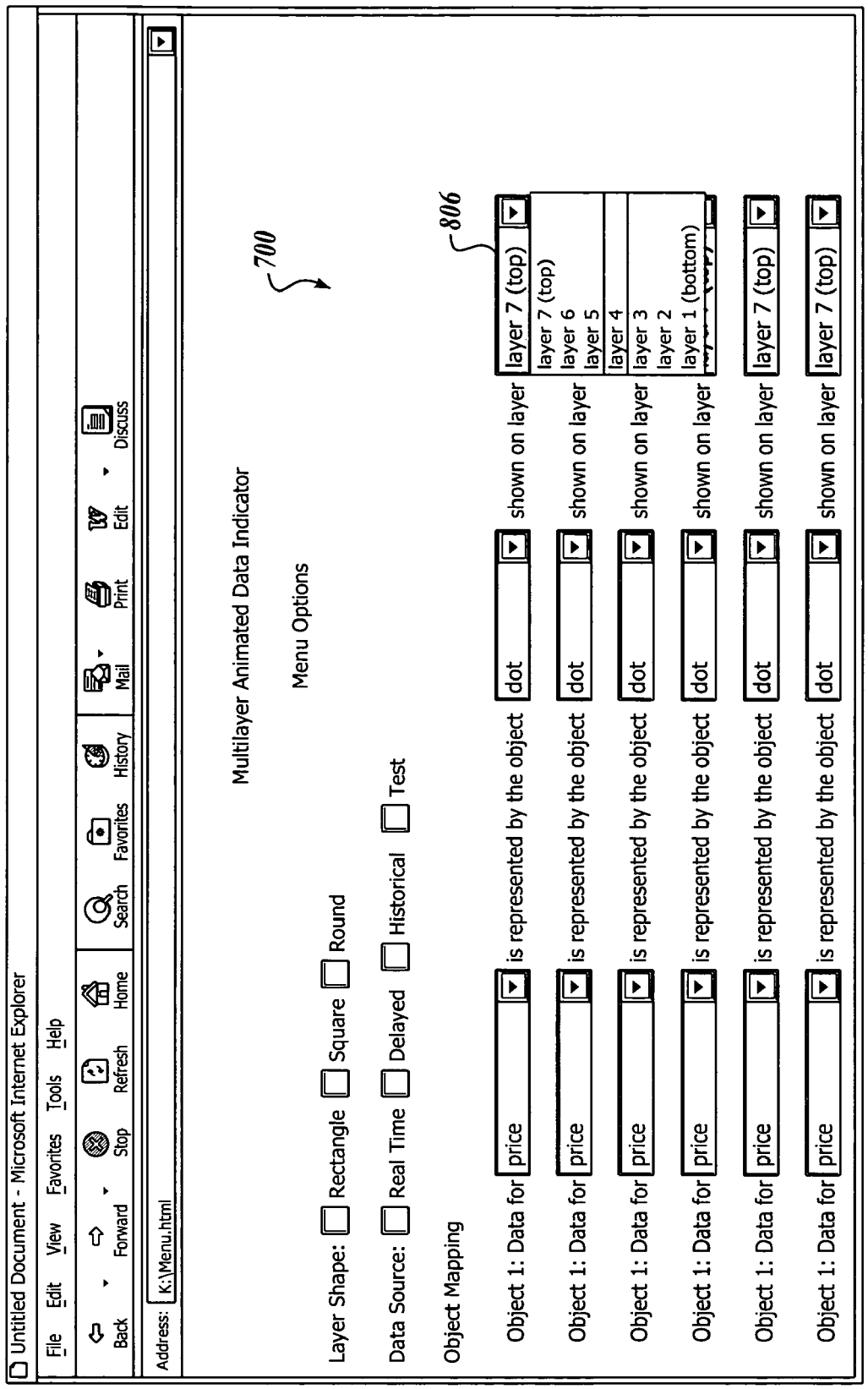

In one embodiment, the multilayer data animation program 11 generates and displays a multilayer animated data indicator menu interface 700 to the user as illustrated in FIG. 7. In this example, the user has navigated to the interface 700 by previously requesting the generation of a multi-level animated data indicator 30/40 for a type of data from a particular data source. As illustrated in the example interface 700, the requested indicator is representing various pieces of market data for a particular stock using several different objects appearing on seven different layers. The object mapping portion of the interface 700 comprises three input areas 702, 706, and 708, in each of which the user can specify which piece of data 702 is represented by which object 704 shown on which layer 706. In the illustrated example, the user is presented with pull-down menus (an example of which is shown in FIGS. 8A-8C), prompting the user with the various choices of data fields, objects, and layers for the requested indicator. However, in other embodiments, the user may directly indicate a data field, object, or layer without being prompted.

The interface 700 may further comprise input areas to define other aspects of the layers and the source of data for the indicator. For example, there may be an input area 708 to specify each layer's shape as rectangle, square, or round, or an input area 710 to specify whether the source of the data that the objects represent is real-time, delayed, historical, or test. Of course, it is understood that input areas for defining other aspects of an indicator may be provided in other embodiments without departing from the scope of the claims that follow. For example, the multilayer data animation program may provide input areas for threshold data values used to change object/layer assignments on the fly as previously described.

In one embodiment, the multilayer data animation program 11 generates and displays pull-down submenus to prompt the user with selections in the multilayer animated data indicator menu interface 700, as illustrated in FIGS. 8A-8C. In the illustrated example, a data pull-down submenu 802 shown in FIG. 8A prompts the user with data fields for various pieces of data including price, volume, temperature, speed, bid, ask, previous day's high (PDH), previous day's low (PDL), ten-week high, ten-week low, 52-week high, etc. An object pull-down submenu 804, shown in FIG. 8B, prompts the user with object fields for various kinds of objects, including a dot, pointer, half-circle, triangle, circle pointer, floating triangle, floating circle, floating square, up arrow, down arrow, and hi bracket, etc. A layer pull-down submenu 806, shown in FIG. 8C, prompts the user with choices for the various layers that comprise the indicator, e.g., layer 1, layer 2, layer 3, etc. It is understood that the example submenu choices are for purposes of illustration only, and that other choices may be provided without departing from the subject matter of the claims that follow.

Having described and illustrated the principles of the invention with reference to illustrated embodiments, it will be recognized that the illustrated embodiments can be modified in arrangement and detail without departing from such principles. For example, while the foregoing description focused on using multilayer animated data indicators to represent financial data, many other types of data are contemplated for use with the multilayer data animation program, such as weather data, scientific data, or other types of complex business or economic data. In addition, the order of the functions performed in the illustration in FIGS. 5A-5D may be altered as long as any subsequent functions that are dependent on the completion of earlier functions are performed after the completion of the functions on which they depend. Also, the order of the initialization functions performed in FIG. 6 may be altered as long as any subsequent functions that are dependent on data are performed after the initialization of the data on which they depend. In addition, as noted above, multilayer animated data indicators comprising objects of any conceivable type or nature may be used to represent complex or interrelated data. Moreover, the appearance of the objects may be altered in any conceivable manner to resolve conflicts between objects competing for display in the same two-dimensional area. In this regard, several aspects of the conflicting objects may be changed, including their size, intensity, opacity, color, shading, dimension (e.g., the illusion of a third dimension), or any other graphical aspect of the displayed object.

Furthermore, even though the foregoing discussion has focused on particular embodiments, it is understood that other configurations are contemplated. For example, it is understood that the described client/server environment in which the present invention may operate to control the simultaneous display of multiple objects using a multilayer animated indicator is just one of several computing environments in which the present invention may operate. As another example, it is understood that the above-described user interfaces illustrated in FIGS. 7-8 are exemplary only, and that some embodiments may employ other interfaces, including non-graphical voice-activated interfaces used in conjunction with a telephone or other audio input device.

Consequently, in view of the wide variety of permutations to the above-described embodiments, the detailed description is intended to be illustrative only, and should not be taken as limiting the scope of the invention. It will be appreciated that various changes can be made therein without departing from the spirit and scope of the invention. What we claim as our invention, therefore, is all such modifications as may come within the scope of the following claims and their equivalents.

The embodiments of the invention in which an exclusive property or privilege is claimed are defined as follows:

1. A method of displaying objects that represent data, the method comprising:
   logically associating an object in a collection of objects with a layer in a predefined hierarchy of layers, the object graphically representing data obtained from a data source, the layer indicating a relative level of importance of the data that the object represents;
   displaying the object simultaneously with another object in the collection of objects;
   simultaneously animating at least two of the displayed objects in their entirety to reflect changes in the data obtained from the data source, wherein the rate of reflected change is calculated for each animated object based on the data obtained from the data source; and
   altering a display of the objects in accordance with the associated layers in the predefined hierarchy of layers indicating the relative levels of importance of the data that the objects represent when the animated displayed objects overlap.

2. The method of claim 1, wherein altering the display of the objects in accordance with the logically associated layers in the predefined hierarchy of layers includes changing an appearance of at least one of the objects to lessen a visual impact of the object logically associated with the lower layer in the hierarchy relative to the visual impact of the object logically associated with the higher layer in the hierarchy.

3. The method of claim 2, wherein changing the appearance of the object includes changing at least one of the size, location, intensity, opacity, color, and dimension of the displayed object.

4. The method of claim 1, wherein altering the display of the objects includes obscuring a portion of the display of the object logically associated with the lower layer in the hierarchy with a portion of the display of the object logically associated with the higher layer in the hierarchy.

5. The method of claim 1, wherein the displayed objects overlap as a result of animating at least one of the objects to reflect changes in the data obtained from the data source and that the object graphically represents.

6. The method of claim 1, further comprising:
   obtaining a data monitoring interval corresponding to the layer in the predefined hierarchy of layers, wherein logically associating the object with the layer includes logically associating the object with the layer having a data monitoring interval that is comparable to a rate at which the data that the object graphically represents is changing.

7. The method of claim 6, further comprising:
   automatically changing the layer with which an object is logically associated when changes in the data reach a threshold value.

8. The method of claim 7, wherein the changes in the data include changes in the data that the object itself graphically represents.

9. The method of claim 7, wherein changes in the data include changes in the data related to the data that the object itself graphically represents.

10. The method of claim 7, wherein changes in the data include changes in a rate at which the data is changing.

11. The method of claim 1, wherein altering the display of the objects includes automatically shifting the position of the object to a layer indicating the relative level of importance of data obtained from the data source.

12. The method of claim 1, wherein at least one of the displayed objects is not experiencing a change in data.

13. An apparatus for controlling the display of objects that graphically represent data, the apparatus comprising:
   an indicator having layered objects that graphically represent data obtained from a data source, each layer having a priority indicating a level of importance of the data that objects residing on the layer graphically represent, at least two of the objects being simultaneously animated in their entirety to graphically represent changes in the data obtained from the data source over time, wherein the rate of change is calculated for each animated object based on the data obtained from the data source;
   a timer to time an interval for each layer, after which interval objects on that layer are updated to reflect any changes in the data obtained from the data source; and
   a controller to control a display of the indicator, the controller enhancing the display of objects on layers having a higher priority relative to the display of objects on layers having a lower priority.

14. The apparatus of claim 13, wherein enhancing the display of objects includes changing at least one of the size, location, intensity, opacity, color and dimension of objects that are in conflict.

15. The apparatus of claim 13, wherein enhancing the display of objects includes obscuring at least a portion of at least one object on a layer having the lower priority with an object on layers having the higher priority when those objects are in conflict.

16. The apparatus of claim 13, wherein the controller is to further control the layering of objects in the indicator in accordance with the layer's priority and an importance of the data that the objects graphically represent.

17. The apparatus of claim 16, further comprising a threshold value, wherein to control the layering of objects includes automatically re-layering the objects when changes in the data reach the threshold value.

18. The apparatus of claim 17, wherein automatically re-layering the objects includes automatically logically associating an object with a layer having a different priority when the threshold value is reached.

19. The apparatus of claim 17, wherein the changes in the data include changes in the data that the object itself graphically represents.

20. The apparatus of claim 13, wherein at least one of the displayed objects is not experiencing a change in data.

21. The apparatus of claim 17, wherein changes in the data include changes in the data related to the data that the object itself graphically represents.

22. The apparatus of claim 17, wherein changes in the data include changes to the frequency with which the data is changing.

23. A system for displaying objects that represent data, the system comprising:
   (a) a data source;

(b) objects that graphically represent in their entirety data obtained from the data source, the objects having characteristics for animating graphically represented data;

(c) a memory in which to store instructions to process the objects; and (d) a processor to implement the instructions to:
(i) organize the objects into layers, each layer having a display priority that corresponds to a level of importance of the data that the objects in that layer graphically represent, and an interval that corresponds to a frequency with which to monitor changes in the data;
(ii) update the objects in their entirety at each interval to reflect changes in the data that the object graphically represents, wherein the rate of reflected changes is calculated based on data obtained from the data source; and
(iii) alter the display of the objects to resolve conflicts between objects simultaneously animating graphically represented data on different layers in accordance with each layer's display priority.

24. The system of claim 23, further comprising a display coupled to the processor for displaying the objects.

25. The system of claim 24, wherein conflicts arise when objects on different layers occupy the same portion of the display.

26. The system of claim 23, wherein the instructions to resolve conflicts in accordance with each layer's display priority includes obscuring the display of objects on layers having a low display priority with the display of objects on layers having a high display priority.

27. The system of claim 23, wherein the instructions to resolve conflicts in accordance with each layer's display priority includes altering the display of conflicting objects to lessen a visual impact of objects on layers having a low display priority relative to objects on layers having a high display priority.

28. The system of claim 23, wherein the instructions to alter the display of the objects to resolve conflicts include instructions to alter at least one of a location, color, size, intensity, opacity and dimension of a display of an object.

29. The system of claim 23, wherein the memory in which to store instructions is to further store a threshold value after reaching which the level of importance of the data changes, and the instructions to organize the objects into layers includes re-organizing at least one of the objects into a layer having a display priority corresponding to the changed level of importance.

30. The system of claim 23, further comprising an external interface for communicating the layered objects to at least one other device for display.

31. A computer-readable medium having a computer-executable component for controlling the simultaneous display of multiple objects according to a relative priority of the data that each object graphically represents, wherein the computer-executable component controls the simultaneous display of the objects by logically assigning each object to a visual layer of a predefined hierarchy of layers in accordance with the relative importance of the data that the object graphically represents;

determining whether the display of any of the objects on one layer conflict with the display of objects on another layer; and altering at least two of the conflicting objects to enhance a visual impact of the object on the more important visual layer relative to the object on the less important visual layer;

wherein at least one of the objects is animated in its entirety and wherein the rate of animation change is calculated based on data obtained from a data source.

32. The computer-readable of claim 31, wherein altering at least one of the conflicting objects to enhance the visual impact of the more important object includes altering at least one of the size, location, intensity, opacity, color and dimension of the object.

33. The computer-readable of claim 31, wherein altering at least one of the conflicting objects to enhance the visual impact of the more important object includes obscuring the less important object.

34. The computer-readable medium of claim 31, wherein the computer-executable component further controls the simultaneous display of the objects by determining whether the data that the objects graphically represent has reached a threshold value that changes the relative importance of the data that at least one of the objects graphically represents; and automatically re-assigning the affected object to a different layer in accordance with the changed relative importance of the data that the object graphically represents.

35. The computer-readable medium of claim 31, wherein at least one of the conflicting objects is not altered.

* * * * *

UNITED STATES PATENT AND TRADEMARK OFFICE
CERTIFICATE OF CORRECTION

PATENT NO. : 7,265,762 B2  Page 1 of 1
APPLICATION NO. : 10/737947
DATED : September 4, 2007
INVENTOR(S) : D. G. Purdy It is certified that error appears in the above-identified patent and that said Letters Patent is hereby corrected as shown below:

| COLUMN | LINE | ERROR |
|---|---|---|
| 20 (Claim 32, | 25 line 1) | after "computer-readable" insert --medium-- |
| 20 (Claim 33, | 30 line 1) | after "computer-readable" insert --medium-- |

Signed and Sealed this

Twenty-ninth Day of April, 2008

JON W. DUDAS
*Director of the United States Patent and Trademark Office*